United States Patent [19]
France

[11] 3,776,356
[45] Dec. 4, 1973

[54] EQUAL FLOW DUAL STEERING SYSTEM

[75] Inventor: Jimmie J. France, Roanoke, Ill.

[73] Assignee: Westinghouse Air Brake Company, Peoria, Ill.

[22] Filed: Mar. 9, 1972

[21] Appl. No.: 233,182

[52] U.S. Cl............ 180/79.2 R, 60/484, 60/486, 91/411 R
[51] Int. Cl.................................................. B62d 5/10
[58] Field of Search............... 180/79.2 R; 60/484, 60/486; 91/411 R

[56] References Cited
UNITED STATES PATENTS

| | | | |
|---|---|---|---|
| 3,602,326 | 8/1971 | Garrison | 180/79.2 R |
| 2,567,074 | 9/1951 | Kupiec | 180/79.2 R X |
| 2,945,544 | 7/1960 | Jacobus | 180/79.2 R |
| 1,657,412 | 1/1928 | Schneider | 180/79.2 R |
| 2,682,929 | 7/1954 | Almond | 180/79.2 R |
| 3,543,644 | 12/1970 | Stacey | 91/411 R |

*Primary Examiner*—Kenneth H. Betts
*Assistant Examiner*—Leslie J. Paperner
*Attorney*—Robert J. Eck

[57] ABSTRACT

An equal-flow power steering system for a vehicle incorporating: a work performing element located on opposite sides of the vehicle and having a reciprocal member operatively connected to the adjacent front wheels; a valve interposed between a source of fluid and each work performing element and being operatively connected to the vehicle steering wheel for effecting selective distribution of fluid to each work performing element; and a structural element associated with each work performing element to assure equal displacement of fluid from said source of fluid.

6 Claims, 4 Drawing Figures

PATENTED DEC 4 1973 3,776,356

3,776,356

EQUAL FLOW DUAL STEERING SYSTEM

BACKGROUND AND SUMMARY OF THE INVENTION

Heretofore, power steering systems of prior art vehicles have employed fluid actuated work performing elements such as double-acting cylinders having extendable and retractable piston rods attached to the related front wheel to accomplish turning of same into the desired attitude. Some prior art vehicles incorporated single cylinders on opposite sides, while others employed dual cylinders. In both cases, however, the outer end portion of the piston rod was connected, as by a link, to the adjacent front wheels with each cylinder being in circuit with a pump having a predetermined displacement so that equal volumes of fluid were simultaneously directed to the related work performing element.

A problem which has long beset the industry regarding the prior art power steering systems is that the fluid being pumped to one side of the vehicle would be directed into the piston end of one cylinder and the rod end of the other. Since the rod end portion of a cylinder has a volume less than the piston end, the difference being equal to the cubic dimension of the piston rod, it would take less fluid on the rod end than on the piston end to move the respective pistons the same linear distance for turning the vehicle front wheels. Accordingly, pressure would build up on the rod side causing shimmying of the vehicle wheels, and frequently, popping of the relief valve during steering. Attempts to employ variable displacement pumps for directing a proportionate volume of fluid to the opposed cylinders have failed because of the sophisticated and expensive control system which would be required.

The present invention eliminates the prior art problem by assuring that equal volumes of fluid will be directed simultaneously to and received by the opposed work performing elements. In one embodiment, the piston is provided with a dummy rod located on the piston rod opposed face of the piston and having cubic dimensions identical with that of the piston rod. Therefore, no matter which end portion of the cylinder receives the fluid, the volume displaced will be the same. The second embodiment incorporates two sets of work performing elements, the respective work performing element of each set being arranged on opposite sides of the vehicle. Each set of work performing elements is connected through fluid lines to separate fluid reservoirs, each having a pump of equal displacement. The fluid lines of each set are connected to the piston side of one element and the rod side of the other. Accordingly, an equal volume of fluid will be directed by the separate pumps to the respective sets of work performing elements to assure an equal displacement of fluid at all times and thereby avoiding shimmying.

An additional feature of the present invention is that the safety of the steering system is enhanced by the provision of two sets of work performing elements. Thus, in the event that the fluid lines of one set of work performing elements rupture or otherwise fail, the other set of work performing elements actuated by independent fluid lines would still have sufficient force to steer the vehicle front wheels until repair is feasible. Accordingly, if a portion of the steering system would fail in the field, the vehicle would have sufficient steering mobility to manuver to a convenient place where it could be repaired without requiring immediate maintenance at the job site.

Therefore, by the present invention the heretofore hazardous shimmying of the front wheels during steering has been alleviated and the safety of the steering system has been augmented substantially.

DESCRIPTION OF PRACTICAL EMBODIMENTS

Figure 1:
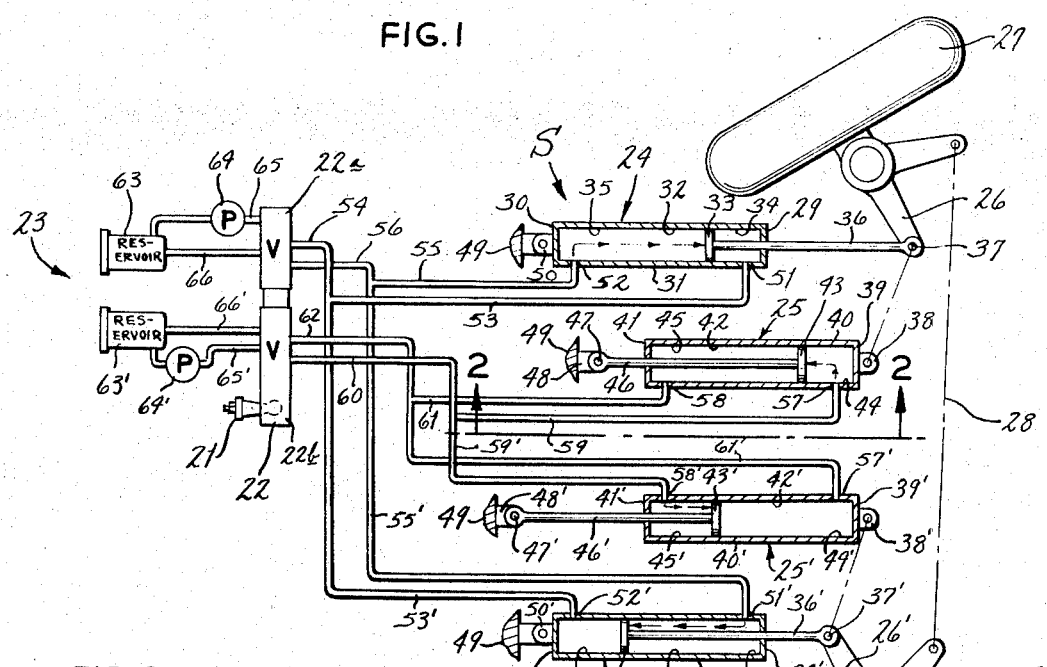
FIG. 1 is a schematic diagram of an equal flow dual steering system constructed in accordance with and embodying the present invention.

Referring now to the drawings wherein like characters designate like elements, there is shown in FIG. 1 a fluid actuated equal flow dual steering system S for a vehicle having a steering wheel (not shown) connected in a usual manner to a lug 21 which is adapted to control a valve 22 for effecting the selective distribution of fluid from a source of fluid 23 to a first set of work performing elements 24,24' and to a second set of work performing elements 25,25', the work performing elements of each set being disposed on opposite sides of the vehicle. The work performing elements 24,25 on one side of the vehicle and the work performing elements 24',25' on the other side of the vehicle are joined, as will be described hereinbelow, to the customary links 26,26', respectively, of the vehicle front wheels 27,27'; said links 26,26' being connected by the usual tie rod 28.

The work performing elements 24,24' of the first set comprise hydraulic cylinders of the double-acting type each having a front wall 29,29', a rear wall 30,30' and an intervening side wall 31,31' respectively; said walls cooperating to define a fluid compartment 32,32', respectively. Slideably received within each fluid compartment 32,32' there is a piston head 33,33', respectively, each of which separates the fluid compartment 32,32' into a forward chamber 34,34' and a rearward chamber 35,35', respectively.

The front wall 29,29' of each work performing element 24,24' has an opening through which projects a piston rod 36,36', one end being integrally formed with the related piston head 33,33' and the outer end being connected by a pin 37,37', respectively, to the related link 26,26'. Each pin 37,37' extends downwardly of each link 26,26' for connection to a lug 38,38', each being fixed to the front wall 39,39' of the respective work performing elements 25,25'. Projecting rearwardly from each front wall 39,39' is a side wall 40,40' which terminates into a rear wall 41,41', respectively, said walls cooperating to define a fluid compartment 42,42'. Slideably received within each fluid compartment 42,42' there is a piston head 43,43' which divides the fluid compartment 42,42', respectively, into forward fluid chambers 44,44' and rearward fluid chambers 45,45'.

Figure 2:
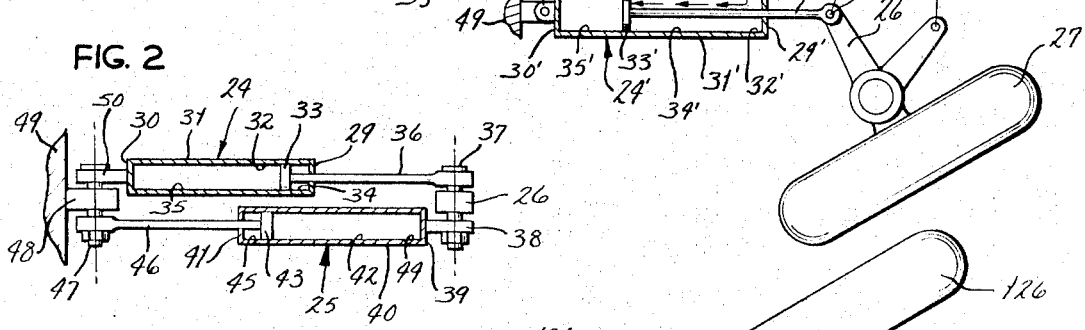
FIG. 2 is a fragmentary elevational view taken substantially on the line 2—2 of FIG. 1 illustrating the peculiar arrangement of the work performing elements on one side of the vehicle.
Figure 4:
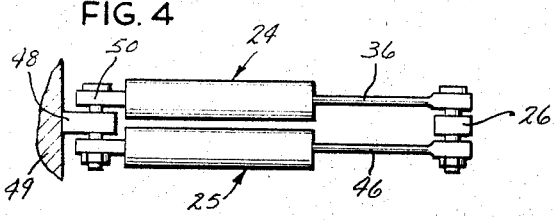
FIG. 4 is a fragmentary elevational view taken substantially on the line 2—2 of FIG. 1 illustrating an optional arrangement of the work performing element on one side of the vehicle.

The rear wall 41,41' of each work performing element 25,25' is formed with an opening through which projects a piston rod 46,46', respectively, one end being formed integrally with the related piston head 43,43' and the other, or rearward, end being connected by a pin 47,47' to a support 48,48' on the vehicle chassis 49. Said pin 47,47' extends upwardly of each support 48,48' for connection to a lug 50,50', each being integrally formed with the respective rear wall 30,30' of the work performing elements 24,24'. It will be observed in FIG. 2, that the work performing elements 24,25 are presented in axially parallel, vertically aligned relationship but disposed at 180° to each other. It will be understood, however, that the work performing elements 24,25 on one side of the vehicle and the work performing elements 24',25' on the other side of the vehicle, may be presented as illustrated in FIG. 4 without departing from the spirit of invention.

Each work performing element 24,24' is provided with a front port 51,51', respectively, being located adjacent the respective front wall 29,29'; and a rear port 52,52', being located adjacent the respective rear wall 30,30'. The front port 51 of work performing element 24 and the rear port 52' of the work performing element 24' are connected by conduits 53,53', respectively, to a fluid line 54 being connected to valve portion 22 a of valve 22. The rear port 52 of work performing element 24 and the forward port 51' of the work performing element 24' are connected by conduits 55,55', respectively, to a fluid line 56 which is also connected to the valve portion 22 a of valve 22.

Each work performing element 25,25' is provided with a front port 57,57', being located adjacent the related front wall 39,39' and a rear port 58,58', being located adjacent the related rear wall 41,41'. The front port 57 of the work performing element 25 and the rear port 58' of the work performing element 25' are connected by conduits 59,59' to a fluid line 60 which is connected to valve portion 22 b of valve 22. Likewise, the rear port 58 of work performing element 25 and the front port 57' of the work performing element 25' are connected by conduit 61,61' to a fluid line 62 which is also connected to the valve portion 22 b of valve 22.

The valve portions 22 a and 22 b are in circuit with the source of fluid 23 which comprises a pair of fluid reservoirs 63,63', each having associated therewith a displacement pump 64,64' for directing fluid to the valve 22 through a feed line 65,65', respectively; therebeing a return line 66,66', respectively interposed between the respective fluid reservoir 63,63' and the related valve portion 22 a and 22 b, respectively.

As will be noted in the description of the operation, the work performing elements 24,24' and 25,25' cooperate for assuring an equal distribution and displacement of fluid from the source of fluid 23. Accordingly, upon actuation of the valve 22 through the manipulation of the lug 21, as by turning of the steering wheel, fluid from the respective fluid reservoir 63,63' will flow through the feed line 65,65', respectively, through the related valve portion 22 a, 22 b of the valve 22 for selective direction to either fluid line 54 or 56 of the first set of work performing elements and fluid line 60 or 62 of the second set depending upon which direction the lug 21 is rotated.

OPERATION

In operation, when the steering wheel is turned counterclockwise, or to the left, the lug 21 will activate the valve 22 for establishing communication between feed line 65,65' and fluid lines 56 and 60, respectively. The fluid in conduit 56 will separate into conduits 55 and 55' for entry into the rearward fluid chamber 35 of work performing element 24 and the forward fluid chamber 34' of the work performing element 24'. The fluid within said compartments 32,32' thus impinges against the related piston head 33,33' for urging the piston rod 36 of the work performing element 24 forwardly and the piston rod 36' of the work performing element 24' rearwardly to effect turning the front wheels 27,27' to the left, as viewed in FIG. 1. Likewise, the fluid in fluid line 60 will separate into conduits 59,59' for entry into the forward fluid chamber 44 of work performing element 25 and into the rearward fluid chamber 45' of work performing element 25'. The fluid within the said chambers 44 and 45' will impinge against the related face of the piston heads 43,43', respectively, for urging work performing element 25 forwardly and the work performing element 25' rearwardly to effect the turning of the front wheels 27,27' to the left.

As the front wheels 27,27' are turning to the left, the fluid within the forward fluid chamber 34 of work performing element 24 and the fluid within rearward fluid chamber 35' of work performing element 24' is returned through conduits 53,53', fluid line 54 and return line 66 to the fluid reservoir 63. Similarly, the fluid within the rearward fluid chamber 45 of the work performing element 25 and the fluid within the forward fluid chamber 44' of work performing element 25' is returned through conduits 61,61', fluid line 62 and return line 66' to the fluid reservoir 63'.

When the steering wheel is turned clockwise, or to the right, the lug 21 will activate valve 22 for establishing communication between respective feed lines 65,65' and the fluid lines 54 and 62, respectively. The fluid within fluid line 54 is divided into conduits 53 and 53' into the forward fluid chamber 34 of work performing element 24 and the rearward fluid chamber 35' of work performing element 24' respectively. The fluid impinges upon the related face of piston 33 and 33', respectively, for urging the piston rod 36 rearwardly and the piston rod 36' forwardly to effect turning of the front wheels 27,27' to the right. The fluid in the rearward fluid chamber 35 of work performing element 24 and the forward fluid chamber 34' of work performing element 24' is returned through conduits 55,55', fluid line 56 and return line 66 to the reservoir 63.

Moreover, fluid within fluid line 62 wil divide into conduits 61,61' for delivery into the rearward fluid chamber 45 of work performing element 25 and the forward fluid chamber 44' of work performing element 25' so that the work performing element 25 is urged rearwardly and the work performing element 25' forwardly to effect turning of the front wheels 27,27' to the right. The fluid within the forward fluid chamber 44 of work performing element 25 and the fluid within forward fluid chamber 45' of work performing element 25' will be returned through conduits 59,59', fluid line 60 and return line 66' to the reservoir 63'.

In this manner, it will be observed, that equal volumes of fluid are simultaneously directed to the first and second sets of work performing elements thereby assuring equal displacement of fluid at all times and avoiding the heretofore common shimmying in steering systems. Moreover, by the provision of two sets of work performing elements on opposed sides of the vehicle, the safety of the steering system is enhanced considerably, for if one set of work performing elements were to fail, the other set would function until repair could be realized.

DESCRIPTION OF ANOTHER PRACTICAL EMBODIMENT

Figure 3:
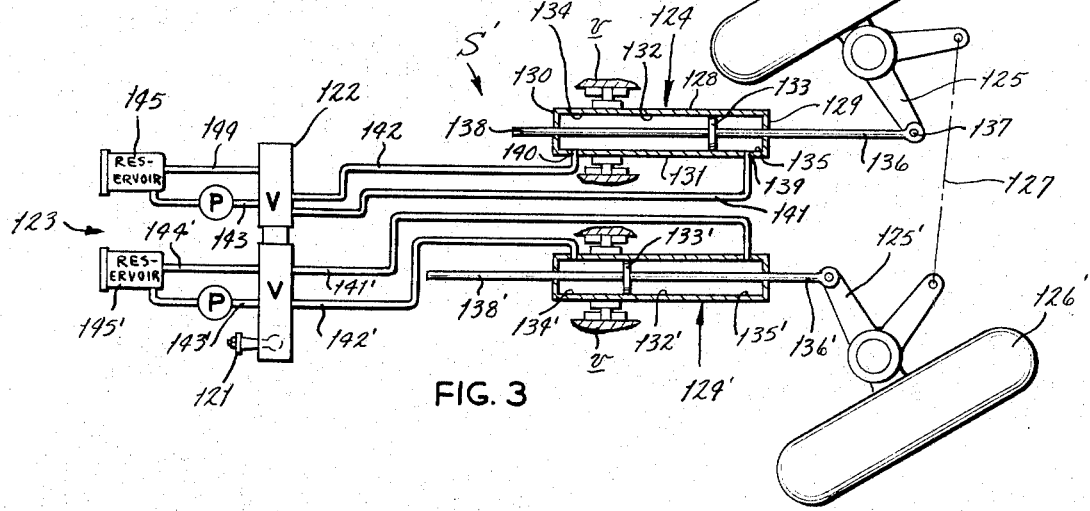
FIG. 3 is a schematic diagram of another embodiment of an equal flow dual steering system constructed in accordance with and embodying the present invention.

Referring now to FIG. 3 of the drawing, there is shown another practical embodiment of a fluid actuated equal flow dual steering systems S' for a vehicle having a steering wheel (not shown) connected in the usual manner to a lug 121 which is adapted to control a valve 122 for effecting the selective distribution of fluid from the source of fluid 123 to a pair of work performing elements 124,124' located on opposite sides of the vehicle and connected to the customary links 125,125', respectively, of the vehicle front wheels 126,126'. Said links 125,125' being connected by the usual tie rod 127. Since the work performing elements 124,124' are identical in all respects, only the work performing element 124 need be described; it being understood that like reference characters will designate like corresponding parts of the work performing element 124'.

Said work performing element 124 comprises a hydraulic cylinder 128 which is suitably fixed to the vehicle chassis v. Said cylinder 128 is of the double-acting type having a front wall 129, a rear wall 130 and an intervening side wall 131; said walls 129, 130 and 131 cooperating to define a fluid compartment 132.

Provided for reciprocal movement within the compartment 132 there is a piston head 133 which divides the compartment 132 into a rearward fluid chamber 134 and forward fluid chamber 135. Integrally formed on the forward face of piston head 133 is one end of a piston rod 136 which projects outwardly of an opening in forward wall 129 having its other or outer end connected to the link 125 as by pin 137. Formed integral with the rearward face of piston head 133 in axial alignment with piston rod 136 is a dummy rod 138 which projects outwardly through an opening in rear wall 130, the outer end being free. The cubic dimensions of piston rod 136 are identical with those of dummy rod 138.

Provided within side wall 131 adjacent the related front and rear walls 129 and 130, are front and rear ports 139, 140, respectively, said front port 139 being connected by conduit 141 to the valve 122, and said rear port 140 being connected by conduit 142 to the valve 122. Interposed between the valve 122 and the source of fluid 123 is a feed line 143 and a return line 144, said lines 143 and 144 being in communication with a fluid reservoir 145 which is a part of the source of fluid 123.

The source of fluid 123 also includes another fluid reservoir 145' which is in communication with the valve 122 through feed line 143' and return line 144'. The fluid reservoirs 145 and 145' operate independently of each other but are designed to displace an equal volume of fluid; fluid reservoir 145 servicing the work performing element 124 and the fluid reservoir 145' servicing the work performing element 124'.

OPERATION

In operation, when the steering wheel is turned counterclockwise, or to the left, the lug 121 will activate the valve 122 for establishing communication between the feed lines 143,143' of the respective fluid reservoirs 145,145' for directing fluid through valve 122 to conduits 142 and 141'. Fluid in conduit 142 will be directed into the rearward fluid chamber 134 of work performing element 124 and simultaneously fluid in conduit 141' will be directed into the forward fluid chamber 135' of work performing element 124'. Thus, the fluid within the compartments 132,132' will impinge against opposed faces of the related piston heads 133,133' for urging the piston rod 136 forwardly and the piston rod 136' rearwardly to effect turning of the front wheels 126,126' to the left. The fluid within the forward fluid chamber 135 of work performing element 125 will be returned through conduit 141 and return line 144 to the fluid reservoir 145. Similarly, the fluid within the rearward fluid chamber 134' of work performing element 124' will be returned through conduit 142' and return line 144' to the fluid reservoir 145'.

When the steering wheel is turned clockwise, or to the right, the lug 121 will activate the valve 122 for establishing communication between the feed lines 143,143' of the respective fluid reservoirs 145,145' and the conduits 141 of work performing element 124 and conduit 142' of the work performing element 124'. Fluid will thus enter the forward fluid chamber 135 of work performing element 124 for urging the piston rod 136 rearwardly and fluid will enter the rearward chamber 134' of work performing element 124' for urging the piston rod 136' forwardly to effect turning of the front wheels 126,126' to the right. Fluid on the opposite face of the respective piston heads 133,133' will pass through the conduits 142 and 141', respectively, and the return lines 144,144' respectively, to the fluid reservoirs 145, 145' respectively.

Accordingly, by the provision of dummy rods 138 and 138' within the work performing elements 124,124', equal displacement of fluid from the respective reservoirs 145,145' will be assured at all times thereby avoiding the heretofore hazardous shimmying in steering systems.

Having thus described my invention, what I claim and desire to obtain Letters Patent for is:

1. In a vehicle having front wheels and a steering system of the type having: A valve having separate portions operatively connected to said steering component; a work performing element located adjacent each front wheel and having a reciprocal member operatively connected to the related front wheel; independent sources of fluid, including pump means of substantially equal displacement, in communication with the respective valve portions; fluid conduit means connecting each valve portion with a work performing element for establishing separate flow circuits between each work performing element and the associated source of fluid; said valve portions cooperating to direct fluid simultaneously through said separate flow circuits to said work performing elements for motivating the reciprocal members thereof in opposite directions to effect the turning of the front wheels; the improvement comprising:

Means for displacing equal volumes of fluid to said work performing elements from the associated source of fluid comprising:

An auxiliary work performing element located adjacent the related work performing element for each front wheel;

Each auxiliary work performing element having an auxiliary reciprocal member connected to the reciprocal member of the related work performing element;

Said fluid conduit means including branch fluid lines connecting said auxiliary work performing elements within the respective flow circuits of said fluid conduit means.

2. The improvement as defined in claim 1 and further characterized by:

Each work performing element having a longitudinal axis presented in axially parallel, vertically aligned relationship with the longitudinal axis of the related auxiliary work performing element;

Said work performing element of one front wheel being in the flow circuit of one source of fluid and its related auxiliary work performing element in the flow circuit of the other source of fluid;

Means coupling the reciprocal members of the adjacent work performing element and the auxiliary work performing element for each front wheel for effecting simultaneous extension and retraction thereof responsive to the fluid flow from said independent source of fluid.

3. The improvement as defined in claim 1 and further characterized by:

The work performing element of one front wheel being in the same flow circuit of said fluid conduit means as the auxiliary work performing element of the other front wheel.

4. The improvement as defined in claim 1 and further characterized by:

Said work performing element comprising a first cylinder; a first piston within said first cylinder having a piston rod projecting outwardly therefrom;

Said auxiliary work performing element comprising a second cylinder presented in axially parallel, vertically aligned relationship with said first cylinder;

A second piston within said second cylinder having a piston rod projecting outwardly thereof;

Said first and second cylinders being arranged longitudinally in 180° relationship;

Said coupling means operatively connecting the piston rod of one cylinder and the rod remote end of the other cylinder to the related front wheel, the piston rod of said other cylinder being fixed.

5. In a vehicle having front wheels and a steering component, a steering system of the type having: Valve means operatively connected to said steering component; work performing means associated with said front wheels for turning same; first and second sources of fluid, including pump means, in communication with said valve means; fluid conduit means connecting said valve means and said work performing means for establishing separate flow circuits between the work performing means and each source of fluid; the improvement comprising:

Said work performing means comprising a first set of opposed work performing elements, each having a reciprocal member operatively engaged to the related front wheel of the vehicle;

A second set of opposed work performing elements each having a reciprocal member operatively engaged to the related front wheel;

Said work performing elements of each first set being in axially parallel, vertically aligned relationship with the related work performing elements of said second set;

Means coupling the reciprocal member of the adjacent work performing elements of each set to the related front wheel;

Said fluid conduit means including a first flow circuit connecting said first set of work performing elements to said first source of fluid and a second flow circuit connecting said second set of work performing elements to said second source of fluid;

Said valve means being controlled by said steering component for directing fluid through said first and second flow circuits to motivate the reciprocal members of each set of work performing elements in opposite directions, thereby turning said front wheels.

6. The improvement as defined in claim 5 and further characterized by:

The work performing element of each set comprising a cylinder; a piston within each cylinder having a piston rod projecting outwardly therefrom;

The adjacent cylinders being arranged longitudinally in 180° relationship;

said coupling means operatively connecting the piston rod of one cylinder and the rod remote end of the other cylinder to the related front wheel, the piston rod of the other cylinder being fixed.

* * * * *